United States Patent
Anijs

(10) Patent No.: US 10,327,453 B2
(45) Date of Patent: Jun. 25, 2019

(54) PROCESSES FOR PRODUCING DARK RED AND DARK BROWN NATURAL COCOA

(71) Applicant: OLAM INTERNATIONAL LIMITED, Singapore (SG)

(72) Inventor: Harrold Glenn Anijs, Almere (NL)

(73) Assignee: OLAM INTERNATIONAL LIMITED, Singapore (SG)

( * ) Notice: Subject to any disclaimer, the term of this patent is extended or adjusted under 35 U.S.C. 154(b) by 0 days.

(21) Appl. No.: 14/392,194

(22) PCT Filed: Jun. 4, 2014

(86) PCT No.: PCT/US2014/040785
§ 371 (c)(1),
(2) Date: Dec. 23, 2015

(87) PCT Pub. No.: WO2014/209550
PCT Pub. Date: Dec. 31, 2014

(65) Prior Publication Data
US 2016/0157507 A1 Jun. 9, 2016

Related U.S. Application Data

(60) Provisional application No. 61/839,094, filed on Jun. 25, 2013.

(51) Int. Cl.
*A23G 1/00* (2006.01)
*A23G 1/02* (2006.01)
*A23G 1/56* (2006.01)

(52) U.S. Cl.
CPC ............... *A23G 1/56* (2013.01); *A23G 1/002* (2013.01); *A23G 1/0023* (2013.01); *A23V 2002/00* (2013.01)

(58) Field of Classification Search
CPC ............................. A23G 1/002; A23G 1/0023
See application file for complete search history.

(56) References Cited

U.S. PATENT DOCUMENTS

| | | | |
|---|---|---|---|
| 2,278,471 A | 4/1942 | Musher | |
| 2,428,802 A | 10/1947 | Jones et al. | |
| 3,923,847 A * | 12/1975 | Roselius | ............ B01D 11/0203 554/11 |
| 5,009,917 A * | 4/1991 | Wiant | ....................... A23L 5/40 426/262 |
| 6,810,794 B2 * | 11/2004 | Murthy | ................ A23N 12/083 99/355 |
| 7,968,140 B2 * | 6/2011 | Kealey | ..................... A21D 2/36 426/631 |
| 2004/0137122 A1 * | 7/2004 | Purtle | .................. A23G 1/0006 426/489 |
| 2007/0196556 A1 | 8/2007 | Van Der Meer | |
| 2010/0151087 A1 * | 6/2010 | Dumarche | ............. A21D 2/364 426/103 |
| 2012/0003355 A1 * | 1/2012 | Bernaert | ............... A23G 1/0009 426/45 |
| 2012/0027889 A1 * | 2/2012 | Portella | .................... A23G 1/02 426/45 |
| 2015/0004303 A1 * | 1/2015 | Gaca | ...................... A23G 1/002 426/631 |
| 2016/0165918 A1 * | 6/2016 | De Muijnck | ............ A23G 1/56 426/631 |

FOREIGN PATENT DOCUMENTS

| | | |
|---|---|---|
| JP | S48-068777 A | 9/1973 |
| JP | 2011-509681 A | 3/2011 |
| JP | 2012-520077 A | 9/2012 |
| WO | 2009/093030 A1 | 7/2009 |
| WO | 2010/104926 A1 | 9/2010 |
| WO | 2011/012680 A2 | 2/2011 |

OTHER PUBLICATIONS

International Preliminary Report on Patentability, Search Report, and Written Opinion issued in Application No. PCT/US2014/040785 dated Nov. 3, 2014.
Austrialian Examination Report No. 1 issued in Application No. 2014303084 dated Jan. 10, 2017.
Japanese Office Action issued in Application No. 2016-521424 dated Mar. 22, 2018, with English translation.
Philippine Office Action issued in Application No. 1-2015-502832 dated Jan. 22, 2018.
Mexican Office Action issued in Application No. MX/a/2015/017954 dated Jun. 13, 2018.
Australian Examination Report issued in Application No. 2018200103 dated Jun. 28, 2018.

* cited by examiner

*Primary Examiner* — Michele L Jacobson
(74) *Attorney, Agent, or Firm* — Morgan Lewis & Bockius LLP

(57) ABSTRACT

Dark, red and dark, brown natural cocoa products are disclosed. The cocoa products may be cocoa liquor or cocoa powder. Processes for producing the dark, red and dark, brown natural cocoa products are also disclosed.

14 Claims, No Drawings

PROCESSES FOR PRODUCING DARK RED AND DARK BROWN NATURAL COCOA

CROSS-REFERENCE TO RELATED APPLICATIONS

This application is the U.S. National Phase under 35 U.S.C. § 371 of International Application No. PCT/US2014/040785, filed on Jun. 4, 2014, which claims priority to U.S. Provisional Patent Application 61/839,094 filed Jun. 25, 2013, the contents of the entirety of which are hereby incorporated by reference herein.

TECHNICAL FIELD

Methods for producing natural cocoa products are disclosed. Natural, cocoa products including, but not limited to, cocoa liquors, cocoa powders, and food products including such cocoa products are disclosed.

BACKGROUND OF THE INVENTION

Cocoa bean processing includes fermenting harvested beans, drying the beans, de-hulling the beans to produce nibs, sterilizing the nibs, roasting the nibs, crushing the nibs into cocoa liquor, and optionally pressing the cocoa liquor to obtain cocoa butter and cocoa powder.

Traditionally, natural cocoa products are light brown in color and have a pH in the range of 5.1 to 6.0. A typical L-value of 10 grams of a natural cocoa in 30 grams of water measured with a Hunterlab colorimeter is 20 or higher, and a- and b-values are 8.5 and higher.

In order to generate darker and more reddish color in cocoa products, a certain amount and type of alkali is added in an alkalization process. Alkalization is a process where cocoa products are alkalized under a certain amount of moisture, at a certain temperature, optionally under pressure, and for a certain amount of time. The alkalization process occurs in the presence of sodium, potassium, ammonium, or magnesium hydroxide or carbonate, for example and without limitation, potash ($K_2CO_3$). The alkalization process alters the flavor, coloring, and solubility of the cocoa powder in water.

Current commercial demands require a cocoa manufacturer to produce cocoa products in a broad palette of colors, flavors, or both. While each manufacturer understands that manipulation of processing conditions such as temperature, water content, duration of processing time, and pH will affect the color and flavor of the cocoa powder produced, there is no general consensus as to how to produce a cocoa product of a consistently desirable color, flavor, or both.

While the alkalization process may be used to produce darker and/or more reddish cocoa products, the presence of the alkalizing agent also affects the labeling of such cocoa products. Such alkalized cocoa products are often labeled as being "processed with alkali." Thus, the presence of the alkalizing agent means such cocoa product cannot be considered "natural" and consumers are demanding "all natural" products. While some natural cocoa products do exist, most of them are light brown in color.

Thus, a growing need exists for cocoa products that possess the color of alkalized cocoa products, yet are considered "natural."

SUMMARY OF THE INVENTION

In each of various embodiments, the present invention helps fulfill these needs and discloses processes for producing "natural" cocoa products that have the colors of alkalized cocoa products. Natural, cocoa products produced by such methods are also disclosed.

In one embodiment, a process for producing a dark, natural cocoa includes mixing a cocoa product selected from the group consisting of cocoa nibs, cocoa beans, and a combination thereof with water, heating the cocoa product and the water to a temperature of at least 85° C., drying the cocoa product, and grinding the cocoa product, thus producing cocoa liquor. The cocoa product is not alkalized during the process.

In a further embodiment, a natural, cocoa product has a color value selected from the group consisting of an L-value of between about 9 and about 26, a C-value of between about 14 and about 29, an H-value of between about 40 and about 57, and combinations of any thereof. The natural, cocoa product also has a pH of less than about 6.

DETAILED DESCRIPTION OF THE INVENTION

In one embodiment, dark, natural cocoa is produced. The cocoa may be dark red or dark brown. The cocoa may be cocoa nibs, de-shelled cocoa beans, cocoa liquor, cocoa cake, or cocoa powder.

In a further embodiment, a process for producing the dark, natural cocoas includes mixing cocoa nibs, cocoa beans, or a combination thereof with water and heating the mixture to a temperature of at least 85° C. The process further includes drying the cocoa nibs, the cocoa beans, or the combination thereof and grinding the cocoa nibs, the cocoa beans, or the combination thereof, thus producing cocoa liquor. The cocoa product is not alkalized. The moisture of the cocoa cake in the water may be between about 35% and about 40%. The water and the cocoa nibs, the cocoa beans, or the combination thereof may also be heated to a temperature of between about 90° C. and 130° C. or a temperature of about 90° C. to about 120° C.

In another embodiment, the cocoa nibs, the cocoa beans, or the combination thereof and the water may be subjected to pressure, such as at least 0.5 Bar and even up to about 4 Bar. The cocoa nibs, the cocoa beans, or the combination thereof may be reacted for a time of between about 0 and 300 minutes or for a time of about 30 and about 240 minutes.

The cocoa product may be dried and optionally ground into cocoa liquor. The cocoa liquor may be pressed into cocoa butter and cocoa cake. The cocoa cake may also be ground into a cocoa powder, which may have a fineness of a minimum of 98% through a 200 mesh screen.

In an embodiment, the cocoa product may be of a Cameroon origin, an Ivory Coast origin, and in other embodiments, may be of other origins.

In yet an additional embodiment, the nibs, the de-shelled beans, or the combination thereof are sterilized.

In yet a further embodiment, the cocoa product may be roasted. The roasted cocoa product may be ground, thus producing cocoa liquor. The cocoa liquor may be separated into cocoa butter and cocoa presscake, or the cocoa liquor may be defatted. The cocoa presscake may be further ground into cocoa powder. This process yields natural cocoa products having dark colors and such cocoa products may be unusually red, brown and red-brown.

In another embodiment, the natural cocoa products of the present invention may have a dark color which refers to cocoa products with an L-value less than about 26.0. In other embodiments, the natural cocoa product may have an L value of between about 9 and about 25, inclusive of intervals between those values. The natural cocoa product may also have a C-value of between about 15 and about 28, inclusive of intervals between those values. The natural cocoa product may also have an H-value of between about 40 and 55, inclusive of intervals between those values. The natural, cocoa product may also have a pH of less than about 7, less than about 6, or between about 5 and about 6. The cocoa product may be a cocoa liquor or a cocoa powder.

In one embodiment, a starting material for the processes described herein may be de-shelled cocoa beans which refers to any suitable cocoa bean fraction/product having the shells substantially removed, broken, and/or winnowed. Non-limiting examples of de-shelled cocoa beans include, but are not limited to, nibs, kernels, and cotyledons. De-shelled cocoa beans typically contain a small fraction of contaminating shells that are within commercially acceptable tolerances since no de-shelling process is 100% complete.

In an additional embodiment, the cocoa beans used to produce the natural cocoa products of the present invention are good fermented. In a further embodiment, the cocoa beans used to produce the natural cocoa products of the present invention are under- or un-fermented.

In one embodiment, the natural cocoa products produced herein are suitable for many commercial purposes, including, without limitation, food products. Examples of food products include, but are not limited to, chocolate, dark chocolate, milk chocolate, semi-sweet-chocolate, baking chocolate, candies, pralines, truffles, candy bars, flavoring syrup, confectionary coatings, compound coatings, fillings, beverages, milk, ice cream, beverage mixes, smoothies, soy milk, cakes, cheesecakes, cookies, pies, diet bars, meal-substitute solid foods and beverages, energy bars, chocolate chips, yogurt, yogurt drinks, pudding, mousse, mole, chocolates with lower bitterness, chocolate with fillings such as yogurt, and/or cheesecake.

A number of objective methods for measuring the color of cocoa products are known. In one method, the Hunter color system or CIE 1976 (CIELAB) and like systems, color may be described in terms of three parameters: Lightness (L)—the light or dark aspect of a color, where the lower the L-value, the darker the cocoa powder will appear; Chroma (C)—the intensity of a color by which one distinguishes a bright or gray color, where the higher the C-value, the brighter the powder will be; and Hue (H)—referring to color in daily speech, such as red, yellow, or blue. For cocoa products, a low H value indicates a red color and a high H-value indicates a brown color.

The C values of the cocoa products of the present invention may be less than about 29, 28, 27, 26, 25, 24, 23, 22, 21, 20, 19, 18, 17, 16, 15, and 14 or lower, inclusive of intervals between those values. The C values may also be a range between about 14 and about 29, a range of between about 15 and about 28, or any ranges encompassed by the numbers 29, 28, 27, 26, 25, 24, 23, 22, 21, 20, 19, 18, 17, 16, 15, and 14.

The L values of the cocoa products of the present invention may be in a range of between about 9 and about 26, a range of between about 10 and about 25, or any ranges encompassed by the numbers 26, 25, 24, 23, 22, 21, 20, 19, 18, 17, 16, 15, 14, 13, 12, 11, 10, and 9.

The H values of the cocoa products of the present invention may be in a range of between about 40 and about 57, a range between about 50 and 55, or any ranges encompassed by the numbers 40, 41, 42, 43, 44, 45, 46, 47, 48, 49, 50, 51, 52, 53, 54, 55, 56, and 57.

The terms "red" or "redder" and "more red" are relative terms and refer to a cocoa product with an H value approximately in the range of from about 40 to about 45 (CIE 1976) that has an H value less than another, reference cocoa product. The terms "brown" and "browner" and "more brown" are relative terms and refer to a cocoa product with an H value approximately in the range of from about 45 to about 55 (CIE 1976) that has an H value greater than another, reference cocoa product.

The CIE 1976 color system describes colors in terms of coordinates L, "a*" and "b*". The L coordinate is consistent with the Value of Lightness, and from the a* and b* coordinates, the Chroma and Hue can be calculated as follows: $C^*=\{\text{square root over } (a^{*2}+b^{*2})\}$; $H=\arctan(b^*/a^*)$.

The spectral color is the result of the source of light and the reflecting surface. For a good reproducible measurement of color, the source of light is standardized. There are two basic approaches for measuring color: visually or by instrumentation. There is a natural human tendency to trust only "one's own eyes." For this reason, colors are still frequently judged visually. To be able to do this in a reproducible manner, certain standard conditions should be met: the light source, for example and without limitation, a CIE standard light source; the positions of the sample, relative to the light source, which are preferably at an angle of 45° to each other; the background of the sample, uniform and preferably gray; the distance between the eyes and the sample and position of the eyes relative to the sample; and the size of the sample.

In practice, color cabinets are used with standard light sources for visual color determinations. Color meters and spectrophotometers are used for instrument color readings. Instrument color measurements were made in the Examples herein using a Datacolor Spectraflash 500 Color spectrophotometer in the manner described herein. Unless otherwise indicated, the color values described in the Examples, and all reference herein to color values L, C, H, a and b (a* and b*, respectively), are readings using the Datacolor Spectraflash 500 Color spectrophotometer. The color parameters described herein refer to the L, C, H parameters that can be calculated from L, a, and b readings according to the CIE 1976 system. The color values recited herein are approximate in the sense that color measurements may vary from spectrophotometer-to-spectrophotometer, typically in the range of +/−0.5 for L, C and H values.

Therefore, the stated values for L, C and H are intended to include such variation inherent between spectrophotometers. The color values of cocoa powders, unless indicated otherwise, are obtained on samples of pulverized cocoa cakes (post pressing to remove cocoa butter) in water.

The following examples illustrate various non-limiting embodiments of the compositions within the present disclosure and are not restrictive of the invention as otherwise described or claimed herein.

EXAMPLES

Trials 1-8.

Charges of 25 kg of cocoa nibs produced from Ivory Coast beans were sterilized in a Drais reactor for 15-20 minutes with open steam at 1 Bar of pressure. After sterilization, the reactor was opened and aerated.

5 kg (20 weight percent with the cocoa nibs) of hot tap water (65-70° C.) was added to the cocoa nibs in the reactor and the reactor was closed. Open steam was injected into the reactor to heat the cocoa nibs to the desired reaction temperature of about 100° C. The cocoa nibs were reacted under such conditions at 100° C. for 30 minutes. After 30 minutes, the temperature of the cocoa nibs was reduced to 90° C. by blowing air through the reactor. The cocoa nibs were re-heated with steam to the reaction temperature of 100° C. After another 30 minutes of reaction, the temperature of the cocoa nibs was reduced to 90° C. by blowing air through the reactor. The process of heating to 100° C. and lowering to 90° C. was repeated until the total reaction time of the cocoa nibs in the reactor was 240 minutes. Samples of cocoa nibs were removed from the reactor at the time intervals or reaction times listed in Table 1, i.e., 0-240 minutes. The reaction was done with outlet valves being open at atmospheric pressure. The temperature was controlled during the reaction using the temperature of the jacket of the reactor and steam injection.

After being reacted for the time specified in Table 1, samples of the cocoa nibs were removed from the reactor. The cocoa nibs were dried in a Retsch laboratory fluidized bed dryer (jet roasting). During drying, the moisture content of the cocoa nibs was reduced from about 35-40% to less than 2.5%.

The dried cocoa nibs were ground into cocoa liquor and the cocoa liquor was pressed into cocoa cakes and cocoa butter. The cocoa cakes were broken into smaller pieces and pulverized into cocoa powder with a Retsch cutting mill using sieves having holes of 0.5 mm in diameter.

The colors (defatted liquor), pH, and moisture of the cocoa liquor were determined. The cocoa powders were analyzed for pH, moisture content, fat content, and intrinsic color in water. Pressed cocoa butter was filtered and analyzed for free fatty acids and iodine value. Results of the analysis and specific process conditions are presented in the following tables.

TABLE 2

Analytical results of cocoa products for Trials 1-8.

| Trial No. | 1 | 2 | 3 | 4 | 5 | 6 | 7 | 8 |
|---|---|---|---|---|---|---|---|---|
| Liquor | | | | | | | | |
| pH | 5.3 | 5.3 | 5.3 | 5.3 | 5.3 | 5.3 | 5.3 | 5.3 |
| % moisture | <1.0 | <1.0 | <1.0 | <1.0 | <1.0 | <1.0 | <1.0 | <1.0 |
| Intrinsic color in water | | | | | | | | |
| L ffd | 22.85 | 22.09 | 21.29 | 20.81 | 19.92 | 19.51 | 18.66 | 18.06 |
| C ffd | 26.43 | 25.30 | 25.00 | 24.59 | 24.22 | 24.23 | 23.55 | 22.83 |
| H ffd | 54.14 | 53.96 | 53.94 | 53.79 | 53.65 | 53.63 | 53.29 | 53.04 |
| Powder | | | | | | | | |
| pH | 5.4 | 5.4 | 5.4 | 5.4 | 5.4 | 5.4 | 5.4 | 5.4 |
| % fat | 12.41 | 12.98 | 12.45 | 12.89 | 13.86 | 13.20 | 13.84 | 13.67 |
| % moisture | 2.55 | 2.35 | 2.55 | 2.39 | 2.40 | 1.71 | 2.09 | 2.39 |
| Intrinsic color in water | | | | | | | | |
| L tot | 24.78 | 24.04 | 23.17 | 22.71 | 21.92 | 21.31 | 20.56 | 19.96 |
| C tot | 27.38 | 26.26 | 25.95 | 25.56 | 25.28 | 25.20 | 24.60 | 23.88 |
| H tot | 54.47 | 54.28 | 54.23 | 54.07 | 53.94 | 53.88 | 53.57 | 53.33 |
| Cocoa butter | | | | | | | | |
| % FFA | 2.06 | 1.91 | 2.24 | 2.05 | 2.06 | 1.95 | 1.90 | 1.96 |
| Iodine value | 34.41 | 34.49 | 34.41 | 34.47 | 34.55 | 36.39 | 34.59 | 34.53 |

Trials 9-19.

Charges of 25 kg of cocoa nibs were sterilized in a Drais reactor for 15-20 minutes with open steam at 1 Bar of pressure. After sterilization, the reactor was opened and aerated.

5 kg (20 weight percent with the cocoa nibs) of hot tap water (65-70° C.) was added to the cocoa nibs in the reactor and the reactor was closed. Open steam was injected into the reactor to heat the cocoa nibs to the desired reaction temperature. The steam inlet valve was closed and the air inlet valve was opened to inject additional air into the reactors to

TABLE 1

Process conditions of Trials 1-8. All cocoa nibs used in these trials were 100% Ivory Coast-1 cocoa nibs.

| Trial No. | 1 | 2 | 3 | 4 | 5 | 6 | 7 | 8 |
|---|---|---|---|---|---|---|---|---|
| Cocoa Nibs | | | | | | | | |
| Moisture % | 8.55 | 8.55 | 8.55 | 8.55 | 8.55 | 8.55 | 8.55 | 8.55 |
| Free Fatty Acid (FFA) % | 1.85 | 1.85 | 1.85 | 1.85 | 1.85 | 1.85 | 1.85 | 1.85 |
| Iodine Value (I.V.) | 34.5 | 34.5 | 34.5 | 34.5 | 34.5 | 34.5 | 34.5 | 34.5 |
| pH | 5.2 | 5.2 | 5.2 | 5.2 | 5.2 | 5.2 | 5.2 | 5.2 |
| Sterilization Process | | | | | | | | |
| Sterilization time, minutes | 15-20 | 15-20 | 15-20 | 15-20 | 15-20 | 15-20 | 15-20 | 15-20 |
| Pressure in reactor (Bar) | 0-1 | 0-1 | 0-1 | 0-1 | 0-1 | 0-1 | 0-1 | 0-1 |
| Moisture of sterilized nibs | 21.2 | 21.2 | 21.2 | 21.2 | 21.2 | 21.2 | 21.2 | 21.2 |
| Reagents added after sterilization | | | | | | | | |
| % tap water added (65-70° C.) | 20 | 20 | 20 | 20 | 20 | 20 | 20 | 20 |
| Reaction Conditions | | | | | | | | |
| Reaction time (minutes) | 0 | 30 | 60 | 90 | 120 | 150 | 180 | 240 |
| Average reaction temp. (° C.) | 100 | 100 | 100 | 100 | 100 | 100 | 100 | 100 |
| Steam-air cycles repeated time (min.) | 30 | 30 | 30 | 30 | 30 | 30 | 30 | 30 |
| Total pressure in reactor (Bar) | 0 | 0 | 0 | 0 | 0 | 0 | 0 | 0 |
| Jacket temp. (° C.) | 100-140 | 100-140 | 100-140 | 100-140 | 100-140 | 100-140 | 100-140 | 100-140 |
| % moisture of nibs after reaction | 21.2 | 33.15 | 33.85 | 31.25 | 32.93 | 32.19 | 31.82 | 32.5 |
| Jet Roasting process | | | | | | | | |
| % moisture of roasted nib | 1-2 | 1-2 | 1-2 | 1-2 | 1-2 | 1-2 | 1-2 | 1-2 | reach a pressure of about 3 Bar. The cocoa nibs were reacted under such conditions at the temperature (ranging from 120-140° C.) and time (ranging from 0-240 minutes) as specified Tables 3 and 4. The temperature was controlled during the reaction using the temperature of the jacket of the reactor. After the reaction, the reactor was aerated by closing the air inlet valve and opening the outlet valves, and the pressure on the cocoa nibs was released. Air was injected through the open outlet valves into the reactor to reduce the temperature of the cocoa nibs in the reactor to about 80° C.

The procedure of closing the outlet valves and introducing steam to the desired reaction temperature and aerating the reactor was repeated several times for some of the trials. The temperature of the cocoa nibs during the reaction was controlled by the temperature of the jacket which was in the range of 120-140° C. The average reaction temperature of the cocoa nibs in the reactor was 120° C. during the reaction time of 0-240 minutes. Samples of cocoa nibs were removed from the reactor at the time intervals or reaction times listed in Tables 3 and 4, i.e., 0-240 minutes.

After the reaction, the reactor was aerated and samples of the cocoa nibs (Trials 9-19) were removed from the reactor.

The cocoa nibs were dried in a Retsch laboratory fluidized bed dryer (jet roasting). During drying, the moisture content of the cocoa nibs was reduced from about 35-40% to less than 2.5%.

The dried cocoa nibs were ground into cocoa liquor and the cocoa liquor was pressed into cocoa cakes and cocoa butter. The cocoa cakes were broken into smaller pieces and pulverized into cocoa powder with a Retsch cutting mill using sieves having holes of 0.5 mm in diameter.

The colors, pH, and other parameters of the cocoa liquor and cocoa powder were determined. Results of the analysis and specific process conditions performed are presented on Tables 3-5.

TABLE 3

Process conditions of Trials 9-14. All cocoa nibs used in these trials were 100% Cameroon cocoa nibs.

| Trial No. | 9 | 10 | 11 | 12 | 13 | 14 |
|---|---|---|---|---|---|---|
| Cocoa Nibs | | | | | | |
| % Fat | 50.2 | 50.2 | 50.2 | 50.2 | 50.2 | 50.2 |
| Moisture % | 6.97 | 6.97 | 6.97 | 6.97 | 6.97 | 6.97 |
| Free Fatty Acid (FFA) % | 3.15 | 3.15 | 3.15 | 3.15 | 3.15 | 3.15 |
| Iodine Value (I.V.) | 35.9 | 35.9 | 35.9 | 35.9 | 35.9 | 35.9 |
| pH | 5.21 | 5.21 | 5.21 | 5.21 | 5.21 | 5.21 |
| Sterilization Process | | | | | | |
| Sterilization time (minutes) | 15-20 | 15-20 | 15-20 | 15-20 | 15-20 | 15-20 |
| Pressure in reactor (Bar) | 0-1.5 | 0-1.5 | 0-1.5 | 0-1.5 | 0-1.5 | 0-1.5 |
| Moisture of sterilized nibs | 19 | 19 | 19 | 19 | 19 | 19 |
| Jacket temperature (° C.) | 120-140 | 120-140 | 120-140 | 120-140 | 120-140 | 120-140 |
| Reagents added after sterilization | | | | | | |
| % tap water added (65-70° C.) | 20 | 20 | 20 | 20 | 20 | 20 |
| Reaction Conditions | | | | | | |
| Reaction time (minutes) | 0 | 60 | 120 | 180 | 240 | 240 |
| Vacuum drying time at 25° C. (min) | | | | | | 60 |
| Average reaction temperature (° C.) | 120 | 120 | 120 | 120 | 120 | 120 |
| Steam-air cycles repeated time (min.) | 30 | 30 | 30 | 30 | 30 | 30 |
| Total pressure in reactor (Bar) | 0 | 3 | 3 | 3 | 3 | 3 |
| Total pressure during vacuum drying (min) | | | | | | −1 |
| Jacket temperature (° C.) | 120-140 | 120-140 | 120-140 | 120-140 | 120-140 | 120-140 |
| % moisture of nibs after reaction | 19 | 32.3 | 34.3 | 36.3 | 38.7 | 21.2 |
| Jet Roasting process | | | | | | |
| % moisture of roasted nib | 1-2 | 1-2 | 1-2 | 1-2 | 1-2 | 1-2 |

TABLE 4

Process conditions of Trials 15-19. All cocoa nibs used in these trials were 100% Ivory Coast-1 cocoa nibs.

| Trial No. | 15 | 16 | 17 | 18 | 19 |
|---|---|---|---|---|---|
| Cocoa Nibs | | | | | |
| % Fat | 51.3 | 51.3 | 51.3 | 51.3 | 51.3 |
| Moisture % | 6.36 | 6.36 | 6.36 | 6.36 | 6.36 |
| Free Fatty Acid (FFA) % | 1.93 | 1.93 | 1.93 | 1.93 | 1.93 |
| Iodine Value (I.V.) | 34.4 | 34.4 | 34.4 | 34.4 | 34.4 |
| pH | 5.15 | 5.15 | 5.15 | 5.15 | 5.15 |
| Sterilization Process | | | | | |
| Sterilization time (minutes) | 15-20 | 15-20 | 15-20 | 15-20 | 15-20 |
| Steam Pressure in reactor (Bar) | 0-1.0 | 0-1.0 | 0-1.0 | 0-1.0 | 0-1.0 |
| Moisture of sterilized nibs | 20.1 | 20.1 | 20.1 | 20.1 | 20.1 |
| Jacket temperature (° C.) | 120-140 | 120-140 | 120-140 | 120-140 | 120-140 |
| Reagents added after sterilization | | | | | |
| % tap water added (65-70° C.) | 20 | 20 | 20 | 20 | 20 |
| Reaction Conditions | | | | | |
| Reaction time (minutes) | 0 | 60 | 120 | 180 | 240 |
| Average reaction temperature (° C.) | 120 | 120 | 120 | 120 | 120 |
| Time between cycles (min.) | 30 | 30 | 30 | 30 | 30 |
| Total pressure in reactor (Bar) | 0 | 3 | 3 | 3 | 3 |
| Jacket temperature (° C.) | 120-140 | 120-140 | 120-140 | 120-140 | 120-140 |
| % moisture of nibs after reaction | 20.1 | 31.7 | 35.0 | 39.3 | 40.4 |

TABLE 4-continued

Process conditions of Trials 15-19. All cocoa nibs used
in these trials were 100% Ivory Coast-1 cocoa nibs.

| Trial No. | 15 | 16 | 17 | 18 | 19 |
|---|---|---|---|---|---|
| Jet Roasting process | | | | | |
| % moisture of roasted nib | 3.5 | 2.9 | 2.7 | 3.3 | 2.8 |

TABLE 5

Analytic results of cocoa products for Trials 9-19.

| Trial No. | 9 | 10 | 11 | 12 | 13 | 14 | 15 | 16 | 17 | 18 | 19 |
|---|---|---|---|---|---|---|---|---|---|---|---|
| Liquor | | | | | | | | | | | |
| pH | 5.5 | 5.4 | 5.3 | 5.2 | 5.1 | 5.15 | 5.27 | 5.24 | 5.21 | 5.16 | 5.11 |
| % moisture | <1.0 | <1.0 | <1.0 | <1.0 | <1.0 | <1.0 | <1.0 | <1.0 | <1.0 | <1.0 | <1.0 |
| Intrinsic color in water | | | | | | | | | | | |
| L ffd | 22.51 | 16.30 | 13.45 | 11.39 | 10.07 | 10.03 | 21.83 | 15.43 | 12.61 | 10.74 | 10.47 |
| C ffd | 24.08 | 22.08 | 19.66 | 17.36 | 15.69 | 15.71 | 26.20 | 21.95 | 18.92 | 16.55 | 16.10 |
| H ffd | 50.70 | 48.77 | 46.29 | 43.86 | 41.96 | 42.39 | 53.97 | 50.19 | 47.25 | 44.64 | 44.61 |
| Powder | | | | | | | | | | | |
| pH | 5.6 | 5.5 | 5.4 | 5.3 | 5.2 | 5.2 | 5.36 | 5.34 | 5.31 | 5.25 | 5.23 |
| % fat | 12.19 | 11.26 | 12.95 | 12.14 | 11.50 | 12.29 | 13.32 | 13.86 | 14.54 | 13.65 | 13.39 |
| % moisture | 1.90 | 1.75 | 2.03 | 2.01 | 1.82 | 1.33 | 1.76 | 1.54 | 1.55 | 1.70 | 1.37 |
| Intrinsic color in water | | | | | | | | | | | |
| L tot | 24.30 | 17.74 | 15.00 | 12.76 | 11.30 | 11.29 | 23.74 | 17.12 | 14.25 | 12.20 | 11.87 |
| C tot | 24.87 | 22.99 | 20.88 | 18.53 | 16.77 | 16.84 | 26.20 | 21.95 | 18.92 | 16.55 | 16.10 |
| H tot | 50.98 | 49.14 | 47.26 | 45.23 | 43.59 | 44.09 | 54.28 | 50.93 | 48.57 | 48.36 | 46.33 |
| Cocoa butter | | | | | | | | | | | |
| % FFA | 2.67 | 2.81 | 2.91 | 3.04 | 3.22 | 3.12 | 1.92 | 2.02 | 2.02 | 2.13 | 2.28 |
| Iodine value | 36.32 | 36.03 | 36.10 | 36.44 | 36.72 | 36.73 | 34.57 | 34.39 | 34.74 | 34.37 | 34.35 |

This disclosure has been described with reference to certain exemplary embodiments, compositions and uses thereof. However, it will be recognized by those of ordinary skill in the art that various substitutions, modifications or combinations of any of the exemplary embodiments may be made without departing from the spirit and scope of the disclosure. Thus, the disclosure is not limited by the description of the exemplary embodiments, but rather by the appended claims as originally filed.

What is claimed is:

1. A process for producing a dark, natural cocoa, comprising:
    mixing a cocoa product selected from the group consisting of cocoa nibs, cocoa beans, and a combination thereof with water;
    heating the cocoa product and the water after mixing to a temperature of at least 85° C., wherein a moisture content of the cocoa product after heating is from about 31% to about 40%;
    drying the cocoa product after heating;
    grinding the cocoa product after drying, thus producing cocoa liquor;
    wherein the cocoa product is not alkalized during the process of producing the cocoa liquor and wherein the cocoa product after grinding has color coordinates according to CIE 1976 color standards of an L-value of between about 9 and about 21, a C-value of between about 14 and about 25, and an H-value of between about 40 and about 54,
    wherein the cocoa product after grinding consists of cocoa.

2. The process of claim 1, further comprising pressing the cocoa liquor, thus producing cocoa cake and cocoa butter.

3. The process of claim 2, further comprising grinding the cocoa cake into a powder.

4. The process of claim 1, further comprising subjecting the cocoa product and the water to an elevated pressure of at least 0.5 bar.

5. The process of claim 4, wherein the cocoa product and the water are subjected to the elevated pressure for a time of between greater than 0 and about 300 minutes.

6. The process of claim 1, wherein the cocoa product and the water are heated to a temperature of between about 90° C. and 130° C.

7. The process of claim 1, further comprising sterilizing the cocoa product with steam prior to mixing the cocoa product with liquid water.

8. The process of claim 1, wherein drying the cocoa product comprises jet roasting the cocoa product.

9. The process of claim 1, further comprising reducing the temperature of the cocoa product and the water heated to the at least 85° C. by at least 10° C.

10. The process of claim 9, further comprising heating the cocoa product and the water to at least 85° C. a second time.

11. The process of claim 10, further comprising reducing the temperature of the cocoa product and the water heated to the at least 85° C. by at least 10° C. a second time.

12. The process of claim 4, further comprising reducing the pressure of at least 0.5 bar to atmospheric pressure.

13. The process of claim 12, further comprising subjecting the cocoa product and the water to the pressure of at least 0.5 bar a second time.

14. The process of claim 3, wherein the cocoa powder has a pH of less than about 6.

\* \* \* \* \*